United States Patent
Sato

(10) Patent No.: US 7,446,425 B2
(45) Date of Patent: Nov. 4, 2008

(54) COOPERATIVE CONTROL APPARATUS

(75) Inventor: Shinichi Sato, Utsunomiya (JP)

(73) Assignee: Keihin Corporation, Tokyo (JP)

( * ) Notice: Subject to any disclaimer, the term of this patent is extended or adjusted under 35 U.S.C. 154(b) by 355 days.

(21) Appl. No.: 10/581,206

(22) PCT Filed: Nov. 30, 2004

(86) PCT No.: PCT/JP2004/017771

§ 371 (c)(1),
(2), (4) Date: Jun. 1, 2006

(87) PCT Pub. No.: WO2005/055389

PCT Pub. Date: Jun. 16, 2005

(65) Prior Publication Data

US 2007/0120538 A1 May 31, 2007

(30) Foreign Application Priority Data

Dec. 3, 2003 (JP) ............................. 2003-404382

(51) Int. Cl.
H02P 9/04 (2006.01)
F02N 11/06 (2006.01)
(52) U.S. Cl. ................................ 290/7; 322/10; 322/37
(58) Field of Classification Search ................. 290/1 A, 290/7, 40 R, 40 C, 46; 322/10, 37; 307/9.1
See application file for complete search history.

(56) References Cited

U.S. PATENT DOCUMENTS

| 5,231,344 | A | * | 7/1993 | Marumoto et al. | ............. 322/14 |
| 6,166,449 | A | * | 12/2000 | Takaoka et al. | ............ 290/40 B |
| 6,459,175 | B1 | * | 10/2002 | Potega | ........................ 307/149 |
| 6,707,169 | B2 | * | 3/2004 | Shimizu et al. | ............ 290/40 C |
| 7,235,897 | B2 | * | 6/2007 | Yokoyama et al. | ........... 307/9.1 |
| 7,330,014 | B2 | * | 2/2008 | Obayashi | ...................... 322/24 |
| 2002/0109407 | A1 | * | 8/2002 | Morimoto et al. | .......... 307/10.1 |

FOREIGN PATENT DOCUMENTS

| JP | 61-280717 | 12/1986 |
| JP | 05-137275 | 6/1993 |
| JP | 9-308298 | 11/1997 |
| JP | 2002-142360 | 5/2002 |
| JP | 2003-70162 | 3/2003 |
| JP | 2003-224935 | 8/2003 |
| JP | 2004-194495 | 7/2004 |

* cited by examiner

Primary Examiner—Nicholas Ponomarenko
(74) Attorney, Agent, or Firm—Squire, Sanders & Dempsey L.L.P.

(57) ABSTRACT

A cooperative control apparatus calculates the total electric load amount of a plurality of electrical loads (W), determines working states of the electrical loads (W), calculates a projected value of the total electrical load amount after a prescribed time, and effects cooperative control of the electrical loads (W) so that the total electrical load amount can be made lower than the threshold value in a case in which the projected value is larger than a threshold value for switching a generation mode of a generator (6) and is in a prescribed range.

6 Claims, 6 Drawing Sheets

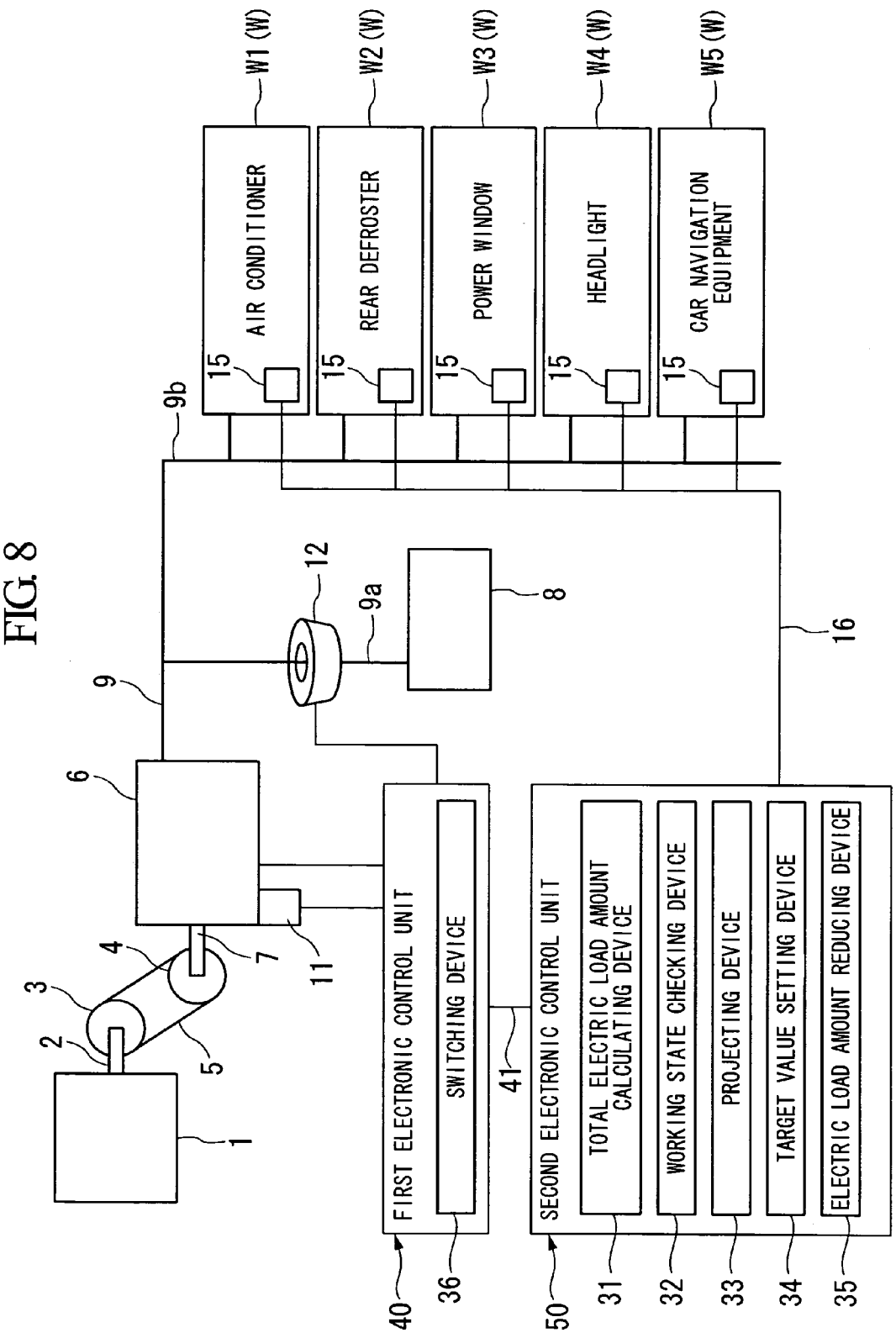

COOPERATIVE CONTROL APPARATUS

TECHNICAL FIELD

The present invention relates to a cooperative control apparatus which controls electrical loads.

Priority is claimed on Japanese Patent Application No. 2003-404382, filed Dec. 3, 2003, the contents of which are incorporated herein by reference.

BACKGROUND ART OF THE INVENTION.

A battery which is provided in a vehicle supplies electric power to devices (i.e., electrical loads) such as an air conditioner, lights and the like. A battery of this type is connected to an electric generator which generates electricity using the rotation of an engine which is provided in the vehicle, and can be charged while the engine is running. There exists a vehicle which can supply electric power directly to the aforementioned devices from the electric generator when the electrical load on the battery is large. This electric generator of the vehicle has a high-generation mode in which it generates much electricity and a low-generation mode in which it generates relatively little electricity. These modes are switched between by an electrical control unit for switching. It is known that the switching of generation modes is performed according to the remaining capacity of the battery, a deceleration state of the vehicle, and a volume of electrical load or the like (see, for example, PATENT DOCUMENT 1).

PATENT DOCUMENT 1: Japanese Unexamined Patent Application, First Publication No. H05-137275 (paragraphs [0023] to [0034] and FIG. 6)

DETAILED DESCRIPTION OF THE INVENTION

Problems to be Solved by the Invention

Conventionally, since the generation modes are switched between according to a determination as to whether the electric load amount exceeds a prescribed value or not, the high-generation mode is selected when the electric load amount slightly exceeds the prescribed value. Therefore, the engine load increases, so that fuel consumption tends to be increased. Furthermore, since the engine load fluctuates when the generation mode is switched, fuel consumption tends to be increased for the reason that the generation mode is frequently switched.

The present invention has been realized in view of the above-described situation and has as an object to reduce the frequency of the switching of the generation mode and the frequency of use of the high-generation mode so as to improve the fuel consumption of the vehicle.

Means for Solving the Problem

The present invention provides a cooperative control apparatus having: a switching device which switches a generation mode of a generator between a low-generation mode and a high-generation mode using a prescribed electrical load amount as a threshold value when the generator is driven by an engine and charges a battery and the battery supplies electrical power to a plurality of electrical loads; a total electric load amount calculating device which calculates a total electric load amount of the plurality of electrical loads; a working state checking device which checks a working state of ones of the plurality of electrical loads; a projecting device which generates a projected value of the total electric load amount of the plurality of electrical loads after a prescribed time elapses according to the total electric load amount and the working states of the plurality of electrical loads; a target value setting device which sets target values of electric load amounts for ones of the plurality of electrical loads; and an electric load amount reducing device which reduces the electric load amount of the plurality of electrical loads, wherein when the projected value of the total electric load amount is larger than the threshold value and a difference between the projected value of the total electric load amount and the threshold value is lower than a prescribed value, a target value of the electric load amount of at least one of the plurality of electrical loads is set and the electric load amount thereof is reduced to the target value so that the total electric load amount is made lower than the threshold value.

In the cooperative control apparatus according to the present invention, the projected value of the total electric load amount of the plurality of the electrical loads after the prescribed time elapses is generated while checking the total electric load amount and monitoring the working state of ones of the plurality of the electrical loads. Then, when the projected value of the total electric load amount is larger than the threshold value for switching the generation mode and the difference between the projected value and the threshold value is lower than the prescribed value, the cooperative control is performed. That is, the target value of electric load amount is set for at least one electrical load, the electric load amount is reduced to the target value, and the total electric load amount is reduced to under the threshold value. The generation mode hereby maintained in the low-generation mode. The electrical load which is cooperatively controlled may be a specific electrical load or other electrical load. Two or more electrical loads may be cooperatively controlled.

According to the cooperative control apparatus of the present invention, when the projected value of the total electric load value is higher than the threshold value for switching the generation mode and lower than the prescribed value, electric load amounts of ones of the electrical loads are reduced. Therefore, in a case in which the electric load amount is projected to exceed the threshold value by only a little, the high-generation mode is not selected and the burden on the engine is not increased needlessly.

In the cooperative control apparatus according to the present invention, it is desirable that a first electronic control unit be provided with the generation mode switching device; and a second electronic control unit which is different from the first electronic control unit be provided with the total electric load amount calculating device, the working state checking device, the projecting device, the target value setting device, and the electric load amount reducing device.

According to the cooperative control apparatus of the present invention, the first electronic control unit and the second electronic control unit may be arranged separately or reduced in size because the first electronic control unit which switches the generation mode and the second electronic control unit which controls electric load amounts of the electric loads are constituted separately.

In the cooperative control apparatus according to the present invention, it is desirable that the electric load amount reduced be an electrical load amount of a load the electrical load amount of which is projected by the projecting device.

According to the cooperative control apparatus of the present invention, when a specific electrical load can be cooperatively controlled, the total electric load amount may be reduced by reducing the electric load amount of the specific electrical load. Therefore, the frequency of switching the generation mode of the generator from the low-generation mode to the high-generation mode is lowered.

In the cooperative control apparatus according to the present invention, it is desirable that the electric load amount reduced be an electrical load amount of a load the electrical load amount of which is not projected by the projecting device.

According to the cooperative control apparatus of the present invention, when a specific electrical load can be cooperatively controlled, the total electric load amount may be reduced by reducing the electric load amount of loads other than the specific electrical load. Therefore, the frequency of switching the generation mode of the generator from the low-generation mode to the high-generation mode is lowered.

The present invention provides a cooperative control apparatus having: a generation mode switching device which switches a generation mode of a generator between a low-generation mode and a high-generation mode using a prescribed electrical load amount as a threshold value when the generator is driven by an engine and charges a battery and the battery supplies electrical power to a plurality of electrical loads; a total electric load amount calculating device which calculates a total electric load amount of the plurality of electrical loads; a working state checking device which checking a working state of ones of the plurality of electrical loads; a projecting device which generates a projected value of the total electric load amount of the plurality of electrical loads after a prescribed time elapses according to the total electric load amount and a working state of a specific electrical load among the plurality of electrical loads; and an electric load amount reducing device which reduces the electric load amount of the plurality of electrical loads, wherein when the projected value of the total electric load amount is higher than the threshold value, a working time of the specific electrical load is determined, and in a case of the working time of the specific electrical load being shorter than a prescribed value, the generation mode of the generator is set to the low-generation mode while the specific electrical load works, and in a case of the working time being longer than the prescribed value, the electric load amount of at least one electrical load among the plurality of the electrical loads is reduced.

In the cooperative control apparatus according to the present invention, the projected value of the total electric load amount of the plurality of the electrical loads after the prescribed time elapses is automatically generated while checking the total electric load amount and monitoring the working state of ones of the plurality of the electrical loads. Then, when the projected value of the total electric load amount is larger than the threshold value for switching the generation mode and a working time of a specific electrical load which raises the total electric load amount is shorter than a prescribed value, the total electric load amount is handled as if not exceeding the threshold value. That is, while the specific electrical load is working, the generation mode of the generator is maintained in the low-generation mode.

According to the cooperative control apparatus of the present invention, when the projected value of the total electric load amount is larger than the threshold value for switching the generation mode and the working time of the specific electrical load which raises the total electric load amount is shorter than the prescribed value, the total electric load amount is handled as if not exceeding the threshold value. Therefore, the high-generation mode is not selected in the aforementioned case and the burden on the engine is not increased needlessly.

In the cooperative control apparatus according to the present invention, it is desirable that a first electronic control unit be provided with the generation mode switching device; and a second electronic control unit which is different from the first electronic control unit be provided with the total electric load amount calculating device, the working state checking device, the projecting device, the target value setting device, and the electric load amount reducing device.

According to the cooperative control apparatus of the present invention, the first electronic control unit and the second electronic control unit may be arranged separately or reduced in size because the first electronic control unit which switches the generation mode and the second electronic control unit which controls electric load amounts of the electric loads are constituted separately.

Advantageous Effects of the Invention

According to the cooperative control apparatus of the present invention, since the burden on the engine is not increased unnecessarily, fuel consumption may be improved. In addition, switching of the generation mode of the generator from the low-generation mode to the high-generation mode is not as frequent, whereby fuel consumption may be improved.

According to the cooperative control apparatus of the present invention, since the first electronic control unit and the second electronic control unit may be arranged separately and reduced in size, these units have high flexibility in positioning within the vehicle body and are easy to maintain.

BRIEF DESCRIPTION OF THE DRAWINGS

FIG. 8 is a block diagram showing a constitution of a cooperative control apparatus according to an embodiment of the present invention.

DESCRIPTION OF THE REFERENCE SYMBOLS

1: engine, 6:generator, 8: battery, 10: electronic control unit, 31: total electric load amount calculating device, 32: working state checking device, 33: projecting device, 34: target value setting device, 35: electric load amount reducing device, 36: switching device (generation mode switching device), 40: first electronic control unit, 50: second electronic control unit, CP: threshold value, W: electrical load amount

BEST MODE FOR CARRYING OUT THE INVENTION

A first embodiment of the present invention will be explained below with reference to the drawings.

Figure 1:
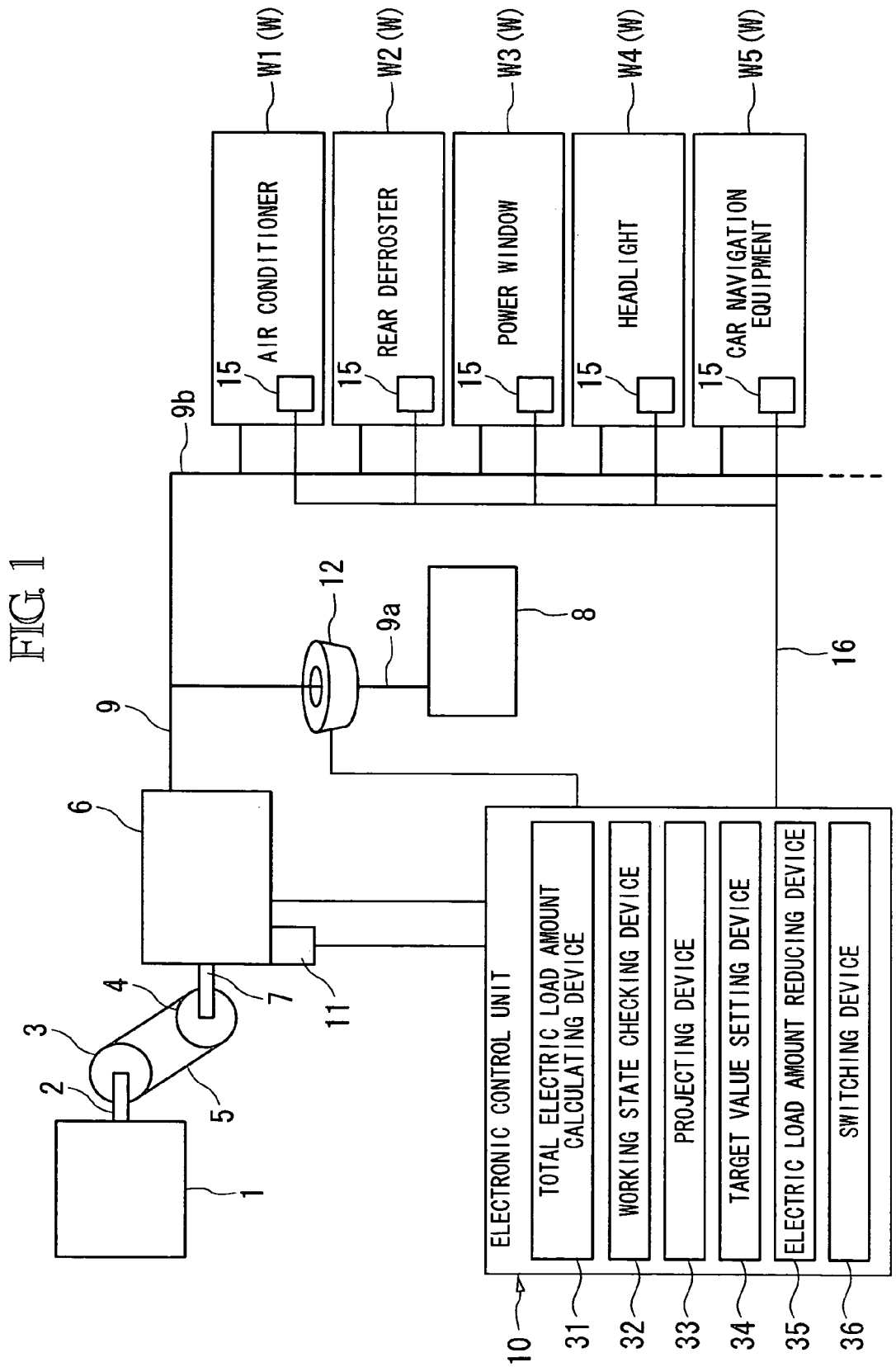
FIG. 1 is a block diagram showing a constitution of a cooperative control apparatus according to an embodiment of the present invention.

As shown in FIG. 1, a pulley 3 is connected to one end of an output shaft 2 of an engine 1 which is an internal combustion engine. An ACG belt 5 is wrapped around the pulley and a pulley 4 which is positioned distant from the pulley 3. The pulley 4 is connected to one end of an input axis 7 of a generator 6. The generator 6 is operated by driving the engine 1.

The generator is an alternating current generator which has a rotor rotating with the input shaft 7, a stator, a rectifier or the like. Such a generator, which is called an alternator, is able to increase and decrease the ability to generate electricity according to a number of revolutions of the engine 1. In the present embodiment, the generator 6 can be operated in a high-generation mode in which a generated voltage or a generated current is large, or in a low-generation mode which generates a lower voltage or a current than the high-generation mode.

A power cable 9 is connected to the generator 6 for supplying the generated power to electrical loads W and a battery 8. An electronic control unit 10 is connected to the generator 6 controlling the generation mode via communication lines. A current sensor 11 which detects the generated power according to its current is mounted on the generator 6. The current sensor 11 is connected to the electronic control unit 10.

The power cable includes a cable 9a connected to the battery 8 and a cable 9b connected to the electrical loads W. A current sensor 12 which detects power discharged from the battery 8 is mounted on the outside of the cable 9a. The output of the current sensor 12 is connected to the electronic control unit 10.

The electrical loads W, which are connected to the cable 9b, are devices having specific functions and being supplied with the electric power from the generator 6 or the battery 8, such as an air conditioner W1, a rear defroster W2, a power window W3, a headlight W4, car navigation equipment, and so on.

The air conditioner W1 is constituted by a compressor, a fan, a motor which rotates the fan, and various switches which are operated by a driver, and so on. The rear defroster W2 is constituted by a rear glass heating wire, a relay for supplying power, a control circuit, and various switches which are operated by a driver, and so on. The power window W3 is constituted by a motor which moves windows, various switches which are operated by a driver, and so on. The headlight W4 is constituted by a lamp, various switches which are operated by a driver, and so on. The car navigation equipment W5 is constituted by a control device, display device, and various switches which are operated by a driver, and so on.

Each electrical load W has a communication unit 15. Each communication unit 15 is connected to the electronic control unit 10 via communication lines 16.

As control information transmitted to the electronic control unit 10, there is information on the electric power (an electric load amount) which is consumed by the electrical loads W, and information which shows working states of the electrical loads W. As the information which shows the working states, for example, for the air conditioner W1, there is information which indicates working (ON) or stopped (OFF), information on fan voltage based on a preset temperature, and information on elapsed time from starting or the like. For the rear defroster W2, information which indicates ON or OFF or the like can be mentioned. For the car navigation equipment W5, information which indicates ON or OFF, and information about the location of the vehicle or the like can be mentioned. The control information on each electrical load W is transmitted to the electronic control unit 10 once every certain period of time.

To the electronic control unit 10, the current sensor 11 of the generator 6 and the current sensor 12 of the battery 8 are connected in addition to the communication units 15 of the electrical loads W. To the electronic control unit 10, various sensors such as a temperature sensor (not illustrated), and other ECUs (electronic control units, which are not illustrated) or the like are connected.

The electronic control unit 10 is constituted by a CPU (Central Processing Unit) and a memory or the like, and has a total electric load amount calculating device 31, a working state checking device 32, a projecting device 33, a target value setting device 34, an electric load amount reducing device 35, and a switching device 36. The total electric load amount calculating device 31 calculates an electric load amount (total electric load amount) according to the information from the electrical loads W and the current sensor 12. The working state checking device 32 receives information from the electrical loads W and other sensors or the like. The projecting device 33 generates a projected value of the total electric load amount after a prescribed time elapses according to the information from the total electric load amount calculating device 31 and the working state checking device 32. The target value setting device 34 sets a target value of the electric load amount of those of the electric loads W to be cooperatively controlled. The electric load amount reducing device 35 reduces the electric load amount of the electrical loads to be cooperatively controlled to the target value. The switching device 36 outputs a signal which switches the generating mode according to the actual total electric load amount on the generator 6.

Here, the cooperative control is control which increases the frequency of operating the generator 6 in the low-generation mode according to the working states of the electrical loads W and the generator 6, or reduces the frequency of switching the generation mode.

Figure 2:
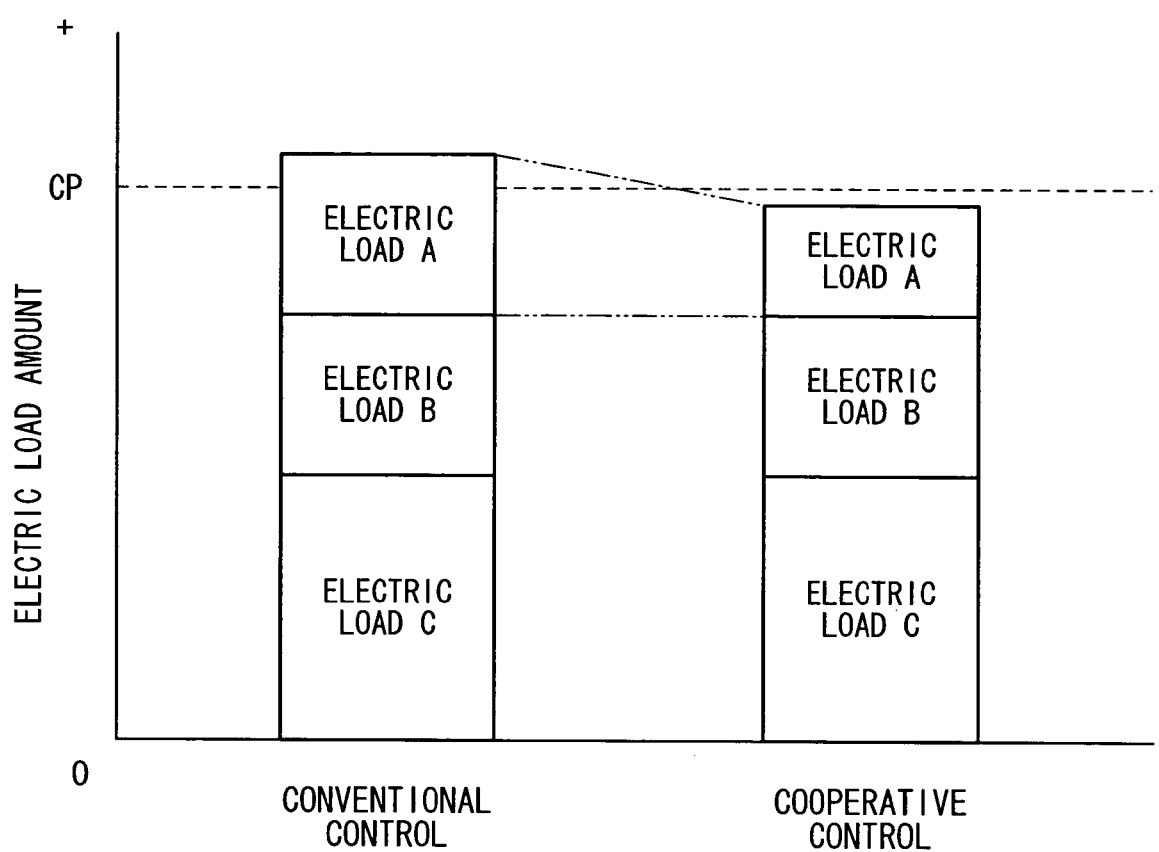
FIG. 2 is a view showing an example of cooperative controlling.

An example of a method of reduction of the total electric load amount by the cooperative control is shown in FIG. 2. In FIG. 2, a case is illustrated in which a total of the electrical load amounts of electrical loads A, B, and C is equivalent to the total electric load amount and the total electric load amount is covered by the generator 6. In FIG. 2, the vertical axis shows the electric load amount. When the total electric load amount exceeds a threshold value CP which is determined according to the ability of the generator 6, the generation mode of the generator 6 is set to the high-generation mode. On the other, when the total electric load amount is below the threshold value CP, the generation mode is set to the low-generation mode. When the generator 6 is driven in the low-generation mode and the vehicle decelerates, injection of fuel is stopped and a deceleration fan of a radiator is rotated, and forced cooling (water cooling control by deceleration) is performed.

In conventional control wherein cooperative control the electric load amount of ones of the electrical loads W is not performed, the generation mode is switched to the high-generation mode with the increase of the total electric load amount when the total electric load amount exceeds the threshold value CP. On the other hand, in the cooperative control apparatus of the present embodiment, the total electric load amount is reduced to below the threshold value CP by reducing the electric power consumed by each of the electrical loads A, B, and C at an equal rate when the total electric load amount exceeds the threshold value CP. Thus, the generator 6 can continue to be driven in the low-generation mode.

In the cooperative apparatus of the present embodiment, the total electric load amount can be reduced to below the threshold value CP by reducing only an electric load amount of a specified electrical load (e.g., the electrical load A of FIG.

2) without changing the electric load amounts of the other electrical loads (the electrical loads B and C).

By setting conditions for determining priority of the electrical loads A, B, and C the electric load amounts of which are to be reduced, the electric load amounts may be reduced in order starting from electrical loads which have priority (e.g., the electrical loads A and B in FIG. 2) so that the total electric load amount is reduced to below the threshold value CP. The electrical loads which have little effect on the passengers and driving conditions are higher in priority.

Furthermore, the total electric load amount can be reduced to below the threshold value CP by reducing an electric load amount of an electrical load (e.g., the electrical load C in FIG. 2) which has a large ratio (load ratio) in the total electric load amount.

Next, operation of reducing the electric load amounts of the electrical loads A, B, and C at the time of the above-mentioned cooperative control will be explained in detail based on FIGS. 3 to 7 with examples the electrical loads W1 to W5 of FIG. 1 used as examples. In FIGS. 3 to 7, the horizontal axis shows time and the vertical axis shows the total electric load amount, and a change of the total electric load amount is shown. The solid lines in the figures show the actual total electric load amount including a case in which the cooperative control is performed. The broken lines show the total electric load amount in a case in which the cooperative control is not performed.

In FIGS. 3 to 7, a highest value HCP of the total electric load amount is set above the threshold value CP, and a lowest value LCP is set below the threshold value CP. The highest value HCP and lowest value LCP correspond to a highest value and lowest value of hysteresis, set in view of hunting of switching of the generation mode. The highest value HCP is set as about 1.1 to 1.3 times the threshold value CP, for example. The lowest value LCP is set as about 0.8 to 0.95 times the threshold value CP, for example.

The cooperative control for the air conditioner W1 will be explained based on FIG. 3.

Figure 3:
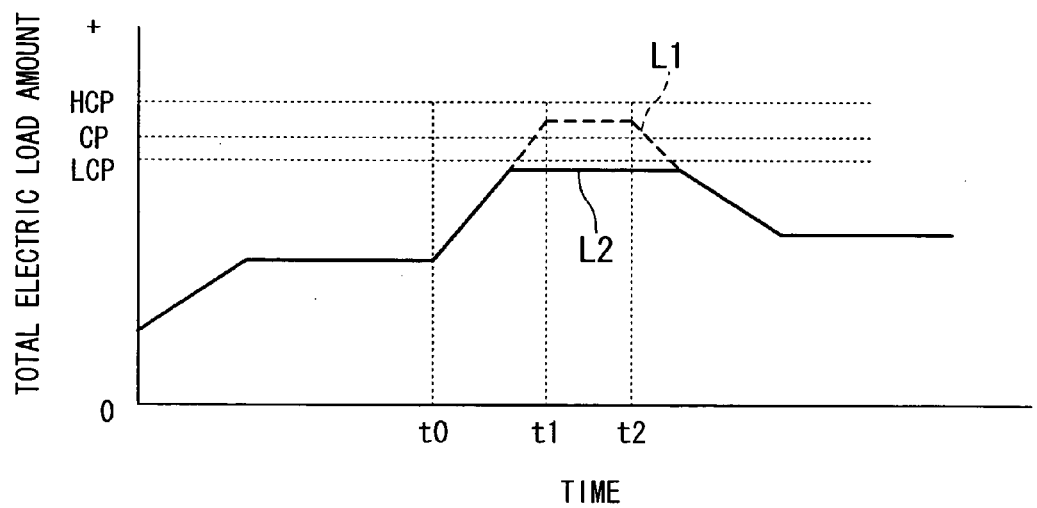
FIG. 3 is a view showing control of a total electric load amount in a case in which a subject for projection is an air conditioner.

In FIG. 3, the total electric load amount until time t0 shows a value of the air conditioner W1 working at a set temperature of 25° C. for example. The total electric load amount at this time is lower than the highest value HCP, so the generator 6 is working in the low-generation mode.

At the time t0, a switch for setting a temperature of the air conditioner W1 or the like is operated so as to input new information, for example, for a set temperature of 20° C. In consequence, the air conditioner W1 sets a target value of the fan voltage so as to bring the temperature in the passenger compartment toward the new set temperature. Specifically, an ECU for the air conditioner (not illustrated) sets a target air blowing temperature in accordance with information from a room temperature sensor, an open air temperature sensor, a sunlight sensor, and the like. In addition, the ECU for the air conditioner refers to a map thereof for the target air blowing temperature and sets the target fan voltage. The target fan voltage is transmitted to the electronic control unit 10 via the communication line from the communication unit 15 reflecting the actual control of the air conditioner W1.

The working state checking device 32 obtains control information on the air conditioner W1. This control information includes the fan voltage at the time t0 and the target fan voltage which is generated by the ECU for the air conditioner along with the change of the set temperature. The total electric load amount calculating device 31 generates the total electric load amount at the time t0.

The projecting device 33 projects a total electric load amount after a prescribed time elapses (at a time t1) from the fan voltage and the total electric load amount at the time t0 and the target fan voltage. Specifically, on the supposition that the fan voltage increases at a regular rate of voltage change, the projected value of the fan voltage at the time t1 is generated. Furthermore, based on the projected value of the fan voltage at the time t1, a projected value of an electric load amount of the air conditioner W1 at the time t1 is generated. Then, by adding the electric load amounts of the other electrical loads W to the projected value of the electric load amount of the air conditioner W1 at the time t1, an obtained value is determined as a projected value of the total electric load amount at the time t1.

In a case in which the projected value of the total electric load amount at the time t1 is lower than the threshold value CP, the electronic control unit 10 does not perform cooperative control. Likewise, in a case in which the projected value of the total electric load amount at the time t1 is higher than the highest value HCP, the electronic control unit 10 does not perform cooperative control. This is in order to supply electric power to the electrical loads W stably.

On the other hand, as shown by the broken line L1 in FIG. 3, in a case in which the projected value of the total electric load amount at the time t1 is higher than the threshold value CP and is lower than the highest value HCP, the electronic control unit 10 performs cooperative control. In this case, the target value setting device 34 sets the target fan voltage so that the electric load amount is moved down to below the threshold value. Then the electric load amount reducing device 35 requires the air conditioner W1 to alter the target fan voltage to the value which is set by the target value setting device 34.

In consequence, the fan voltage of the air conditioner W1 is moved down to a lower value than the initial value in accordance with the set temperature (the fan voltage set by the target value setting device 34). As a result, the electric load amount of the air conditioner W1 is controlled, and the actual total electric load amount at the time t1 is lowered to below the threshold value CP as shown in FIG. 3 by a solid line L2. Thus, the generator is maintained in the low-generation mode.

Next, cooperative control in a case in which the fan voltage of the air conditioner W1 is reduced and the total electric load amount is reduced is explained with reference to FIG. 4.

The working state checking device 32 obtains a compartment temperature and an open air temperature from various temperature sensors once every certain period of time. The projecting device 33 projects a total electric load amount after a prescribed time elapses (at a time t4) from the temperature information which is obtained by the working state checking device 32, the fan voltage, and a total electric load amount calculated by the total electric load amount calculating device. Specifically, a projected value of fan voltage at the time t4 is generated from information at the time t3. Then, based on the projected value of the fan voltage at the time t4, a projected value of the electrical load of the air conditioner W1 at the time t4 and a projected value of the total electric load value at the time t4 are calculated.

In a case in which the projected value of the total electric load amount is higher than the threshold value CP, the electronic control unit 10 does not perform cooperative control. In addition, in a case in which the projected value of the total electric load amount is lower than the lowest value LCP, the electronic control unit 10 does not perform cooperative control either. On the other hand, as shown in FIG. 4 by a broken line L3, in a case in which the projected value of the total electric load amount is equal to or higher than the threshold value CP and equal to or lower than the highest value HCP, the electronic control unit 10 perform cooperative control.

In this case, the electronic control unit 10 performs at least one of control which reduces the fan voltage of the air conditioner W1 and control which reduces the electric power consumption of the other electrical loads W.

In a case in which the fan voltage of the air conditioner W1 is controlled to be reduced, the target value setting device 34 sets the target fan voltage so that the total electric load amount is moved to a lower value than the threshold value CP. Then the electric load amount reducing device 35 requires the air conditioner W1 to alter the target fan voltage to the value which is set by the target value setting device 34.

Control which reduces the electric load amount of the other electrical loads W cuts the electric power consumed by the other electrical loads at a certain rate or reduces the electric power consumed by a specific electrical load W with priority.

Figure 4:
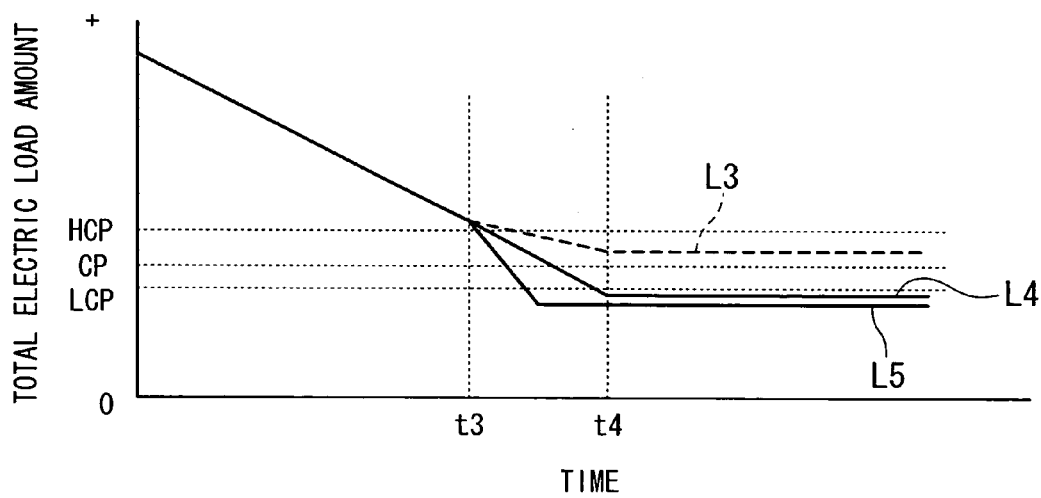
FIG. 4 is a view showing control of a total electric load amount in a case in which a subject for projection is an air conditioner.

In either case, as shown in FIG. 4 by a solid line L4, the total electric load amount at the time t4 is lower than the threshold value CP. Therefore, the generation mode of the generator 6 is switched to the low-generation mode earlier than in a case in which cooperative control is not performed.

In this cooperative control, the control may be performed by setting a specific time (e.g., the time t3 in FIG. 4) as a decision point in advance for a basis of the control. That is, the projected value of the total electric load amount at the time t4, after a prescribed time elapses, is calculated at the decision point. In a case in which the projected value of the total electric load amount is not equal to or lower than the threshold value CP, the electric load amount reducing device 35 requires of the air conditioner W1 to reduce the fan voltage at a regular pace. Thereby, as shown in FIG. 4 by a solid line L5, the total electric load amount falls below to the threshold value CP. Therefore, the generation mode of the generator 6 is switched to the low-generation mode at an early timing.

Figure 5:
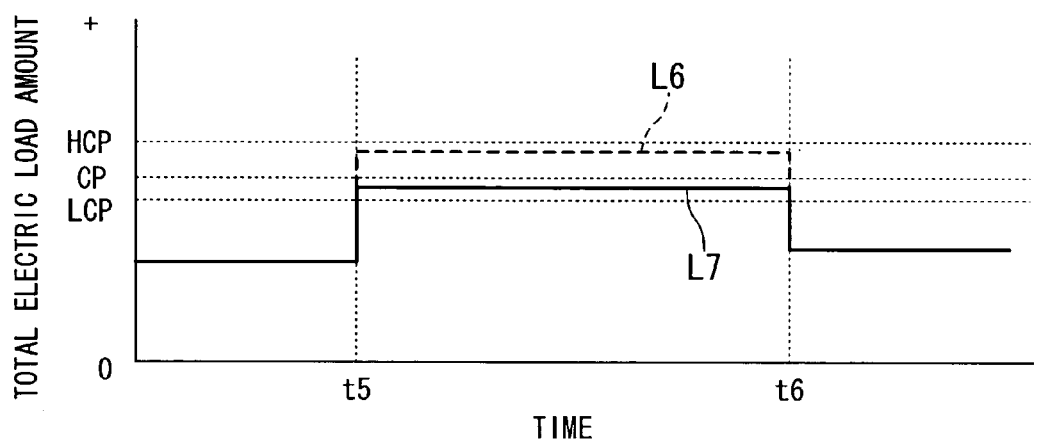
FIG. 5 is a view showing control of a total electric load amount in a case in which a subject for projection is a rear defroster.

Next, cooperative control for an electrical load such as the rear defroster W2 to control an output time by a timer which is provided in the apparatus is explained with reference to FIG. 5.

At a time t5, in a case in which the rear defroster W2 is switched on, the electronic control unit 10 estimates the change of the total electric load amount before actually increase of the electric power consumption of the rear defroster W2. Specifically, in a case in which control information indicates that the rear defroster W2 is switched on, the projecting device 33 adds the increase in electric load amount due to the working of the rear defroster W2 to the total electric load amount at the time t5, and then the projected value of the total electric load amount is calculated. In a case in which the projected value of the total electric load amount is equal to or higher than the threshold value CP and below the higher value HCP as shown in FIG. 5 by a broken line L6, the electric load amount reducing device 35 reduces the electric load amount of other electrical loads A. Specifically, the target value setting device 34 select an electrical load W the electric load amount of which to reduce and sets an amount of decrease. Then the electric load amount reducing device 35 submits the necessary control information to the subject electrical load W.

Thus the cooperative control of the other electrical loads W is started, and then the electronic control unit 10 outputs control information to the rear defroster W2 to allow functioning. The electric load amount of the rear defroster W2 is increased by the functioning. However, since the other electrical loads W are cooperatively controlled, the total electric load amount is equal to or lower than the threshold value CP as shown by a solid line L7 and the low-generation mode is maintained.

The rear defroster W2 starts the timer at the beginning of functioning. When the count of the timer ends at, for example, a time t6, the rear defroster W2 is automatically stopped and outputs control information indicating the stopping to the electronic control unit 10. When stopping the rear defroster W2, since the electric load amount of the rear defroster W2 becomes zero, the electronic control unit 10 finishes the cooperative control of the other electrical loads W when it receives stop information from the rear defroster W2. Though the cooperative control of the other electrical loads W is finished, the total electric load amount is reduced by the electric load amount of the rear defroster W2. Therefore, the low-generation mode of the generator 6 is maintained. In addition, in a case in which the driver stops the rear defroster W2 before the timer count ends, the same control may be performed.

Figure 6:
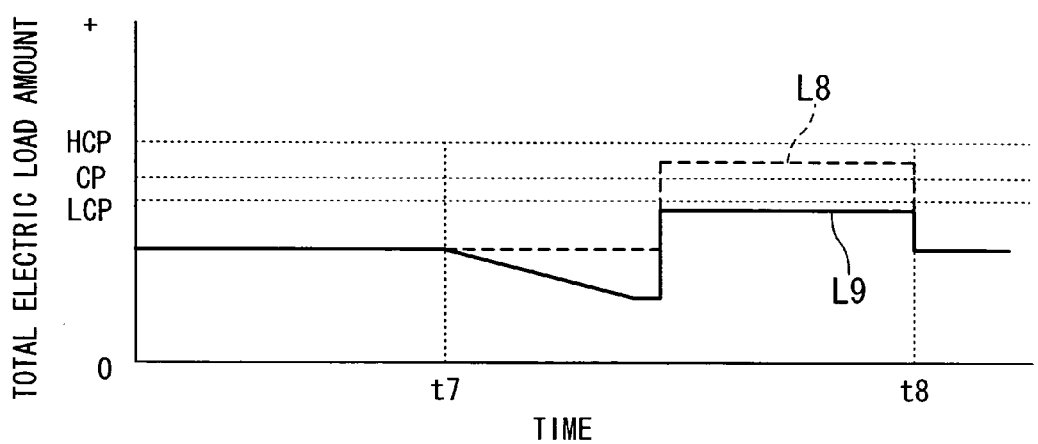
FIG. 6 is a view showing control of a total electric load amount in a case in which a subject for projection is a headlight.

Next, regarding lights such as the headlight W4, cooperative control utilizing the car navigation equipment W5 is explained with reference FIG. 6.

The car navigation equipment W5 outputs control information to the electronic control unit 10 which gives notice of the vehicle entering a tunnel at a prescribed time judging from the current position of the vehicle and map data. In the electronic control unit 10, the working state checking device 32 receives control information from the car navigation equipment W5. Then, the projecting device 33 projects the total electric load amount for when the car is to travel in the tunnel. Specifically, in a case in which the vehicle is projected at a time t7 to enter a tunnel after a prescribed time has elapsed, the projected value of the electric load amount after switching on of the headlight W4 is calculated. The projected value of the electric load amount is added to the total electric load amount at the time t7. A result value of the addition is the projected value of the total electric load amount after the prescribed time elapses. In a case in which the projected value of the total electric load amount after the prescribed time elapses is below the threshold value CP, the electronic control unit 10 does not perform the cooperative control. On the other, as shown in FIG. 6 by a broken line L8, in a case in which the projected value of the total electric load amount after the prescribed time elapses is equal to or greater than the threshold value CP and is below the highest value HCP, the electronic control unit 10 cooperatively controls the other electrical loads W. Consequently, as shown in FIG. 6 by a solid line L9, the total electric load amount falls below the threshold value CP and the low-generation mode is maintained.

There is time between projection by the projecting device 33 and entry of the vehicle into the tunnel and actual switching on of the headlight W4. Therefore, the total electric load can be reduced slowly over this time by the cooperative control.

The headlight W4 is turned off when the vehicle exits the tunnel at a time t8. At this time, control information which indicates the turning off of the headlight W4 is sent to the electronic control unit 10. The electronic unit 10 confirms the turning off of the headlight W4 and terminates the cooperative control of the other electrical loads W.

According to the cooperative control apparatus, the projected value of the total electric load amount is generated based on the working state of the electrical loads W at some time point, and the cooperative control is performed while the projected value is in a prescribed range. Therefore, the electric power consumption is stabilized at a low value, and the total electric load amount is easy to keep below the threshold value CP. Therefore, the frequency of switching the low-generation mode to the high-generation mode of the generator 6 is lower than in the prior art, and the fuel consumption of the engine 1 is improved. In addition, since the frequency of change of the generation mode becomes low, motive power loss due to changing is lower. Therefore, the fuel consumption of the engine 1 is further improved.

Furthermore, since the electrical loads W are controlled so that the total electric load amount is lightly changed after projecting the change of the total electric load amount, the electric load state of the vehicle is stabilized.

In the present embodiment of the cooperative control apparatus, the projected value of the total electric load amount after a prescribed time elapses may be calculated by projecting load change of the two or more electrical loads W. An example of this case is a case in which a timing of switching the air conditioner W1 and a timing of entry into the tunnel occur at about the same time.

In the cooperative control apparatus of the present embodiment, the electrical loads W may submit information in reply to the control of the electronic control unit 10 in the communication between the electrical loads W and the electronic control unit 10. In this way, the load of the communication unit 15 for the electrical loads W may be reduced so that the apparatus may be reduced in size. In addition, a traffic amount of communication may be reduced by having the electronic control unit 10 check the working state of the electrical loads W when necessary.

Next, a second embodiment of the present invention will be explained with reference to the drawings.

In the present embodiment, a total electric load amount is controlled in a case in which a period of an electric load amount being higher than a threshold value CP is within a certain period of time instead of in a case in which the total electric load amount is within a certain range, as in the cooperative control apparatus shown in FIG. 1.

For example, regarding the air conditioner W1, as shown in FIG. 3 by a wavy line L1, by setting a target temperature at the time t0, the electric load amount can be increased from the time t0 a maximum value at the time t1 and changed very little thereafter until the time t2. The electric load amount is reduced when the room temperature is stabilized at the time t2 to reach the target temperature. That is, the electric load amount of the air conditioner W1 is reduced after a certain time (corresponding to a period from the time t1 to the time t2).

In such a case, the electronic control unit 10 which has information on the time period provided in advance or which obtains information on the time period by the air conditioner W1 using the working state checking device 32 controls the electric load amount in accordance with a length of the time period. Specifically, similarly to in the above-mentioned embodiment, a total electric load amount at the time t0 is calculated and control information for the air conditioner W1 is obtained, so that a projected value of a total electric load amount at the time t1 can be calculated. Then, in a case in which the projected value of the total electric load amount at the time t1 exceeds the threshold value CP, the electronic control unit 10 determines how long this will be the case. Then, in a case in which this time is within a certain period, the electronic control unit 10 cooperatively controls the air conditioner W1 so that the total electric load amount is kept to below the threshold value CP by controlling the fan voltage. Here, the above-mentioned certain period is over which difficulty will not occur even though the electric load amount is set low. In a case in which the projected value of the total electric load amount at the time t1 is below the threshold value CP, cooperative control is not performed. In addition, even if a period during which the projected value of the total electric load amount is higher than the threshold value CP is long, the electronic control unit 10 performs cooperative control similarly to in the first embodiment if the projected value of the total electric load amount is below the highest value HCP. Thus, the generator 4 can be maintained in the low-generation mode in any cases.

According to the present embodiment, the total electric load amount can be kept below the threshold value CP when it temporary exceeds the threshold value CP by way of cooperative controlling. Therefore, the frequency of driving in the low-generation mode is increased and fuel consumption is improved. In addition, switching of the generation mode over a short period of time is prevented, so that motive power loss is decreased and fuel consumption is improved.

Next, a third embodiment of the present invention will be explained with reference the drawings.

In the present embodiment, in a case in which an increase in the electric load amount in the cooperative control apparatus shown in FIG. 1 is ended after a very short time, the generator is fixed in the low-generation mode without changing of the actual total electric load amount. Here, regarding electrical loads for doors such as a power window W3 or the like, the present embodiment will be explained with reference to FIG. 7.

The power window W3 is equipment for opening and shutting the door window by driving a motor when a passenger pushes a switch. The driving time thereof is short, and the motor is stopped within one minute. Other examples of such equipment (electrical loads) are electric-powered sunroof equipment which opens and shuts a window fitted in a roof of the vehicle using a motor or the like, a power seat which can adjust a seat position using a motor, an electric-powered housing mirror, and the like.

Figure 7:
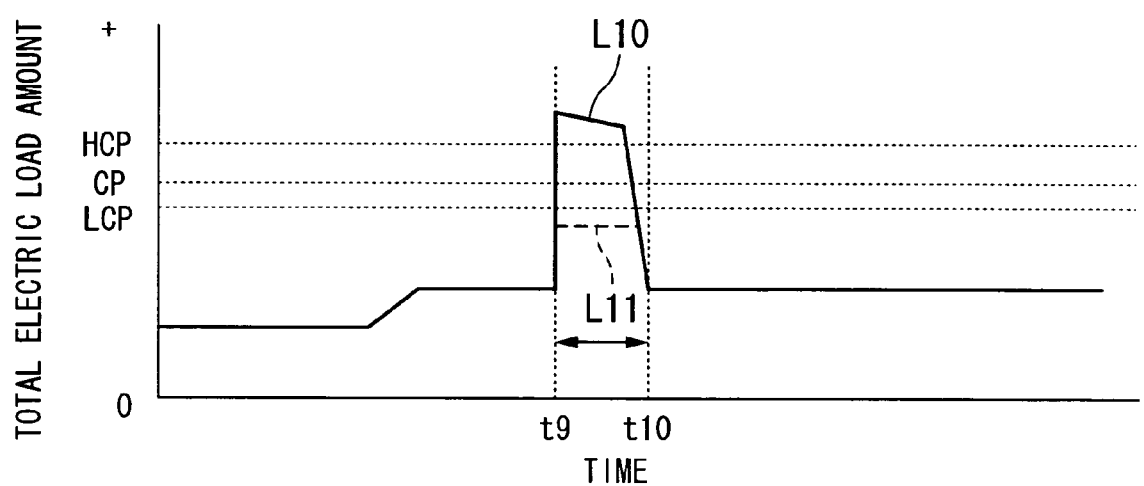
FIG. 7 is a view showing control of a total electric load amount in a case in which a subject for projection is a power window.

At a time t9 in FIG. 7, if the power window W3 is switched on, the electronic control unit 10 projects the changing of the total electric load amount before the power window W3 actually works. Specifically, by input of control information to the working state checking device 32 indicating that the power window W3 is switched on, a total electric load amount at the present time t9 is added to an electric load amount increase for driving the power window W3, and the projected value of the total electric load amount is generated by the projecting device 33. In a case in which the projected value of the total electric load amount exceeds the threshold value CP as shown in FIG. 7 by a solid line L10, the target value setting device 34 sends fake data (refer to the broken line L11) which shows the total electric load amount being below the threshold value CP to the switching device 36. The switching device 36 recognizes the total electric load amount as being below the threshold value CP. Therefore, event though the actual total electric load amount exceeds the threshold value CP, the generation mode of the generator is not switched. Then, since the period during which electric power is supplied to the power window W3 is short as described above, the total electric load amount lowers to below the threshold value CP in a short time. Thereby, in a case in which the electric load amount is only briefly increased, the occurrence of motive-power loss due to a switching of the generation mode is prevented.

According to the present embodiment, in a case in which the total electric load amount changes for a brief time, since the electronic control unit 10 fixes the generation mode of the generator 6, the frequency of switching the generation mode can be lowered. Therefore, motive-power loss occurring due to switching of the generation mode is avoided, and fuel consumption is improved.

Next, a fourth embodiment of the present invention will be explained with reference to the drawings. The same reference symbols as in the above-mentioned embodiments are used for common elements, and overlapping descriptions are omitted.

As shown in FIG. 8, a cooperative control apparatus of the present embodiment includes a first electronic control unit 40 and a second electronic control unit 50 which is connected to the first electronic control unit 40 via a communication line 41.

The first electronic control unit includes the switching device 36 and is connected to the generator 6, the current sensors 11 and 12, and the second electronic control unit 50. To the first electronic control unit, other sensors (not illustrated) are also connected.

The second electronic control unit 50 includes the total electric load amount calculating device 31, the working state checking device 32, the target value setting device 34, and the electric load amount reducing device 35. The second electronic control unit 50 is connected to the electrical loads via the communication lines.

The cooperative control apparatus according to the present embodiment will be explained.

The second electronic control unit 50 obtains output information on the generator 6 and information about the electric power which is inputted/outputted to/from the battery 8 via the first electronic control unit 40, and the total electric load amount is calculated by the total electric load amount calculating device 31. In addition, the working state checking device 32 checks a working state of each of the electrical loads W in accordance with various sensor (not illustrated) information which is obtained via the first electronic control unit and information on the electrical load W which is obtained via the communication line 16. Hereinafter, similarly to in the above-mentioned first to third embodiments, the total electric load amount after a prescribed time is projected, cooperative control is performed if necessary, and the frequency of use of the low-generation mode of the generator 6 is increased.

According to the present embodiment, the same effects as in the first embodiment can be obtained. In addition, since the first electronic control unit 40 and the second electronic control unit 50 are separately embodied, they can be reduced in size. Furthermore, the two units can be arranged separately and the flexibility of layout is improved. For example, by arranging the second electronic control unit 50 between a driving seat and an engine compartment, maintainability is improved.

Preferable embodiments of the present invention are explained above, but the present invention is not limited to the above-mentioned embodiments. Additions, omissions, substitutions, and other modifications can be made without departing from the spirit or scope of the present invention. For example, the electrical load W may be wiper equipment, an electric-powered window, a defroster for a windshield or the like.

The cooperative control apparatus can be applied to vehicles such as two-wheeled vehicles, three-wheeled vehicles, and four-wheeled vehicles.

The present invention is not limited by the above explanation but is limited only by the scope of the claims appended hereto.

INDUSTRIAL APPLICABILITY

The present invention relates to a cooperative control apparatus having: a switching device which switches a generation mode of a generator between a low-generation mode and a high-generation mode using a prescribed electrical load amount as a threshold value when the generator is driven by an engine and charges a battery and the battery supplies electrical power to a plurality of electrical loads; a total electric load amount calculating device which calculates a total electric load amount of the plurality of electrical loads; a working state checking device which checks a working state of ones of the plurality of electrical loads; a projecting device which generates a projected value of the total electric load amount of the plurality of electrical loads after a prescribed time elapses according to the total electric load amount and the working states of the plurality of electrical loads; a target value setting device which sets target values of electric load amounts for ones of the plurality of electrical loads; and an electric load amount reducing device which reduces the electric load amount of the plurality of electrical loads, wherein when the projected value of the total electric load amount is larger than the threshold value and a difference between the projected value of the total electric load amount and the threshold value is lower than a prescribed value, a target value of the electric load amount of at least one of the plurality of electrical loads is set and the electric load amount thereof is reduced to the target value so that the total electric load amount is made lower than the threshold value. According to the cooperative control apparatus of the present invention, since the burden on the engine is not increased needlessly, fuel consumption may be improved. In addition, the generation mode of the generator is not so frequently switched from the low-generation mode to the high-generation mode, and thereby fuel consumption may be improved.

The invention claimed is:

1. A cooperative control apparatus comprising:
   a switching device which switches a generation mode of a generator between a low-generation mode and a high-generation mode using a prescribed electrical load amount as a threshold value when the generator is driven by an engine and charges a battery and the battery supplies electrical power to a plurality of electrical loads;
   a total electric load amount calculating device which calculates a total electric load amount of the plurality of electrical loads;
   a working state checking device which checks a working state of ones of the plurality of electrical loads;
   a projecting device which generates a projected value of the total electric load amount of the plurality of electrical loads after a prescribed time elapses according to the total electric load amount and the working states of the plurality of electrical loads;
   a target value setting device which sets target values of electric load amounts for ones of the plurality of electrical loads; and
   an electric load amount reducing device which reduces the electric load amount of the plurality of electrical loads, wherein
   when the projected value of the total electric load amount is larger than the threshold value and a difference between the projected value of the total electric load amount and the threshold value is lower than a prescribed value, a target value of the electric load amount of at least one of the plurality of electrical loads is set and the electric load amount thereof is reduced to target value so that the total electric load amount is made lower than the threshold value.

2. A cooperative control apparatus according to claim 1, further comprising:
   a first electronic control unit which is provided with the generation mode switching device; and
   a second electronic control unit which is different from the first electronic control unit and which is provided with the total electric load amount calculating device, the working state checking device, the projecting device, the target value setting device, and the electric load amount reducing device.

3. A cooperative control apparatus according to claim 1 or 2, wherein
the electric load amount reduced is an electrical load amount of a load the electrical load amount of which is projected by the projecting device.

4. A cooperative control apparatus according to claim 1 or 2, wherein
the electric load amount reduced is an electrical load amount of a load the electrical load amount of which is not projected by the projecting device.

5. A cooperative control apparatus comprising:
a generation mode switching device which switches a generation mode of a generator between a low-generation mode and a high-generation mode using a prescribed electrical load amount as a threshold value when the generator is driven by an engine and charges a battery and the battery supplies electrical power to a plurality of electrical loads;
a total electric load amount calculating device which calculates a total electric load amount of the plurality of electrical loads;
a working state checking device which checking a working state of ones of the plurality of electrical loads;
a projecting device which generates a projected value of the total electric load amount of the plurality of electrical loads after a prescribed time elapses according to the total electric load amount and a working state of a specific electrical load among the plurality of electrical loads; and
an electric load amount reducing device which reduces the electric load amount of the plurality of electrical loads, wherein
when the projected value of the total electric load amount is higher than the threshold value, a working time of the specific electrical load is determined, and in a case of the working time of the specific electrical load being shorter than a prescribed value, the generation mode of the generator is set to the low-generation mode while the specific electrical load works, and in a case of the working time being longer than the prescribed value, the electric load amount of at least one electrical load among the plurality of the electrical loads is reduced.

6. A cooperative control apparatus according to claim 5, wherein
a first electronic control unit is provided with the generation mode switching device, and
a second electronic control unit which is separate from the first electronic control unit is provided with the total electric load amount calculating device, the working state checking device, the projecting device, and the electric load amount reducing device.

* * * * *